Oct. 15, 1946.    D. METTETAL, JR    2,409,507
AUTOMATIC DIRIGIBLE TANDEM WHEEL UNIT
Filed Feb. 22, 1945
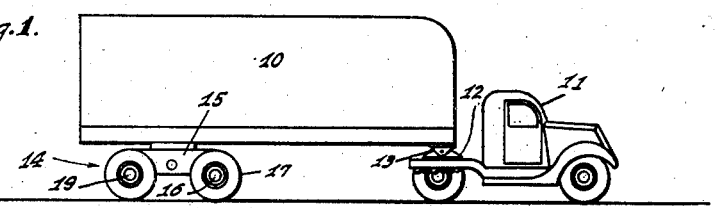
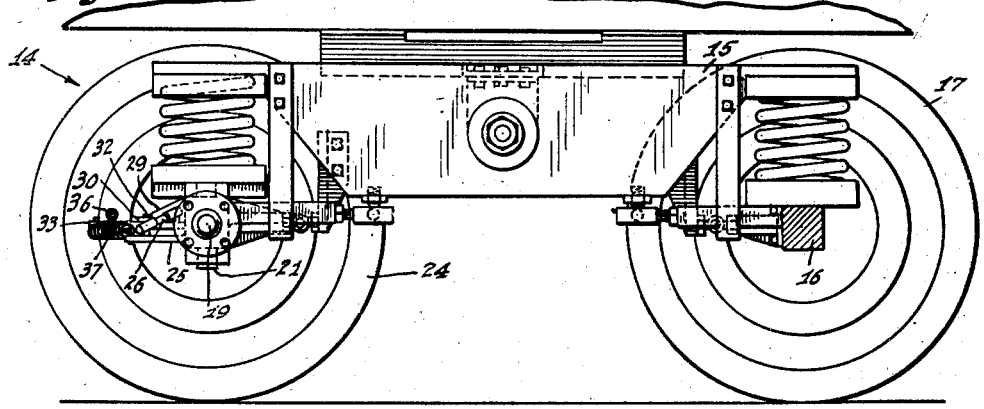
INVENTOR.
DONALD METTETAL, Jr.
BY
Hood & Hahn
ATTORNEYS.

Patented Oct. 15, 1946

2,409,507

UNITED STATES PATENT OFFICE 2,409,507

AUTOMATIC DIRIGIBLE TANDEM WHEEL UNIT

Donald Mettetal, Jr., Indianapolis, Ind.

Application February 22, 1945, Serial No. 579,289

7 Claims. (Cl. 280—80)

The present application is a continuation in part of my co-pending application Ser. No. 570,237, filed December 29, 1944, now abandoned, and is filed for the purpose of correcting an obvious error in the disclosure of the said co-pending application.

The present invention relates to an automatic dirigible tandem wheel unit, and is particularly concerned with the provision of automatic means for overcoming the scuffing of tires in tandem wheel units, and the objectionable effects which inevitably result from such action. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a more or less diagrammatic view of a tractor and semi-trailer having a tandem wheel unit supporting its rear end;

Fig. 2 is an enlarged elevation of such wheel unit, taken substantially on the line 2—2 of Fig. 3, with the rear near wheel removed; and Fig. 3 is a plan view of a tandem wheel unit constructed in accordance with my invention.

Several different forms of road vehicles are provided with tandem wheel units; viz., a unit comprising a frame upon which the vehicle is partially supported, and comprising further a front axle and a rear axle, relatively rigidly secured to the frame, and providing journal mountings for wheel pairs. When a vehicle, one end of which is supported by such a unit, is caused to follow a curve in the road, lateral forces must be applied to the body to cause the body to swing; and such forces are transmitted through the body to the frame of the tandem wheel unit, and thence to the wheels. If the two pairs of wheels are rigid with respect to the frame, and if neither wheel pair is dirigible with respect to its axle, it will be perfectly obvious that at least one wheel pair will necessarily be scuffed laterally across the road surface, since the force which tends to swing one end of a vehicle body laterally, when applied to the frame of a tandem wheel unit, is converted into a force tending to move one pair of wheels laterally in one direction, and tending to move the other pair of wheels laterally in the opposite didection.

In an effort to overcome the objectionable results of such scuffing, it has heretofore been proposed to provide some sort of steering mechanism for one or both pairs of wheels of a tandem wheel unit. In one known form, means is provided for operatively connecting the steering wheel of a vehicle to swing one pair of wheels of a tandem wheel unit to cause that pair of wheels to follow a track permitting the other pair of wheels to swing about an axis passing through one only of the wheels of such other pair. In another known form, a drag link, providing a tow connection between a tractor and a trailer having a tandem wheel unit, is connected, either mechanically or through a fluid system, to dirigible wheels in the tandem unit in such a fashion that the drag link swings about an axis, and thereby causes suitable adjustment of a dirigible pair of wheels in the tandem unit.

The most common instance of the use of a tandem wheel unit is at the rear end of a semi-trailer, in an organization such as that illustrated in Fig. 1 hereof. Such an organization comprises a semi-trailer 10 and a tractor 11, the tractor being provided with a turntable or fifth wheel 12 to which is connected, and upon which is supported, the front end of the trailer through the medium of a coupling 13 of known form. The rear end of the trailer is carried upon a tandem wheel unit indicated generally by the reference numeral 14.

Obviously, it would not be feasible to provide a mechanical connection between the steering wheel of the tractor 11 and dirigible wheels on the tandem unit 14. In such an assembly, it would be possible to provide means, actuated by rotational movement of the turntable 12, to control dirigible wheels on the unit 14; but even such a system would involve mechanical complications which would be not only expensive but also subject to frequent breakdown.

When the tractor 11 of an assembly such as that illustrated in Fig. 1 is driven around a curve, it drags the leading end of the trailer 10 to one side of a straight line, thereby applying a lateral force to the trailer body, and that lateral force is transmitted through the trailer body to the unit 14. If, for instance, the tractor is driven around a curve to the right, such force, applied to the unit 14, will tend to shift the front wheels of the tandem unit toward the right, and there will be a corresponding force tending to shift the rear wheels of the unit toward the left. One or both pairs of wheels will scuff laterally, if the wheels are rigidly mounted on their axles. Ideally, means should be provided whereby the tandem unit will be caused to pivot about an axis passing through the journal mounting of the right-hand front wheel. To accomplish that function, it is necessary that the rear wheels of the unit shall swing toward the left, thus causing the rear end of the tandem unit to follow a path to the left and outside of the path followed by the front wheels.

I have discovered that the forces applied to the wheels of such a unit, when the tractor of an assembly like that illustrated in Fig. 1 is driven around a curve to the right, for instance, are such that the reaction between the rear wheels and the road surface will swing those wheels toward the left, if the rear wheels are freely dirigibly mounted upon their axle; and I have further discovered that, if those rear wheels are thus dirigibly mounted, and if yielding means is provided, tending to hold the dirigibly mounted wheels in alignment with the front wheels, the dirigibly mounted rear wheels will be so swung, to follow substantially an optimum path, as the assembly is driven around the curve; and those wheels will then return to substantial alignment with the front wheels as soon as the curve has been negotiated and the vehicle returns to traveling in a straight line.

Thus, I have discovered that, if a tandem unit be constructed in the manner disclosed in the present application, substantially optimum results will automatically be obtained, without the necessity for the provision of any manually manipulable means for manually controlling the path to be followed by the dirigibly mounted wheels.

According to my invention, then, the tandem unit 14 may comprise a frame 15 suitably supported upon a front axle 16 on which are rigidly journalled wheels 17, 17; and a rear axle 18. Stub axles 19 and 20 are carried at opposite ends of the rear axle 18, the stub axle 19 being mounted upon the axle 18 through the medium of a king pin 21, and the stub axle 20 being mounted upon the opposite end of the axle 18 through a king pin 22, suitable conditions of caster and camber being provided in accordance with well known principles. Wheels 23 and 24 are journalled upon the stub axles 19 and 20, respectively.

The stub axle 19 is provided with an arm 25 to which is connected one end of a radius rod 26; and the stub axle 20 is similarly provided with an arm 27 to which is suitably connected one end of a radius rod 28.

Mounted upon the axle 18 is a bracket 29 which projects rearwardly from the axle and is formed to provide opposite, laterally projecting arms 30 and 31. Pivotally mounted at 32 at the extremity of the arm 30 is a lever 33, and the opposite end of radius rod 26 is suitably connected to the forward arm of said lever. Similarly mounted at 34 at the extremity of the arm 31 is a similar lever 35, and the opposite end of radius rod 28 is suitably connected to the forward arm of said lever 35. A reach rod 36 has its ends suitably connected to the opposite arms of said levers 33 and 35 at points spaced from the pivotal mountings 32 and 34 substantially equidistantly with the points of connection of the radius rods 26 and 28 with said levers. A spring 37 has one end connected with the arm 25 and its opposite end connected, through a flexible element 38, with the lever 33 at a point beyond the point of connection of the reach rod 36 with said lever; and a similar spring 39 has one end connected with the arm 27 and its opposite end connected, through a flexible element 40, with the lever 35 at a point beyond the point of connection of the reach rod 36 with said lever. Preferably, the rods 26, 28, and 36 will be connected to the arms 25 and 27 and to the levers 33 and 35 through ball-and-socket joints of well-known form.

As shown, the reach rod 36 is preferably adjustable in effective length, the terminal element 36' thereof being adjustably threadedly secured to the body of said rod.

Clearly the just-described resilient linkage system will tend to hold the wheels 23 and 24, in the illustrated positions. However, if the tractor 11 is driven around a curve to the right, the forces applied to the unit 14 and the reactions of the wheels 23 and 24 against the road surface will cause the wheels 23 and 24 to swing in a counter-clockwise direction about their king pins 21 and 22, thereby causing the levers 33 and 35 to swing in a clockwise direction, thus relaxing the flexible element 40 and elongating the spring 37. As the spring 37 is elongated, its resistance to further extension increases, so that the wheels 23 and 24 will seek, and come to rest in, a position which is dependent upon the degree of lateral forces applied to the frame 15, the degree of the reaction between the wheels and the road surface, and the degree of extension of the spring 37. As the assembly rounds the curve and comes back into a straight stretch of road, the forces tending to swing the wheels 23 and 24 in a counterclockwise direction about their king pins are reduced, whereby the spring 37 is permitted to return the parts to the positions illustrated, at which point a balance is struck between the forces applied to the wheels and between the forces applied to the levers 33 and 35 by the springs 37 and 39.

I claim as my invention:

1. A tandem wheel unit comprising a first axle, a pair of wheels journalled thereon, a second axle, stub axles movably mounted at opposite ends of said second axle through king pins, wheels journalled on said stub axles, a radius rod for each of said stub axles, means providing an operative connection between said radius rods, yielding means normally holding said last-named means in a median position, and means providing a connection between said first and second axles.

2. A tandem wheel unit comprising a first axle, a pair of wheels journalled thereon, a second axle, stub axles movably mounted at opposite ends of said second axle through king pins, wheels journalled on said stub axles, lever means fulcrumed adjacent said second axle, a radius rod for each of said stub axles, means connecting said radius rods to said lever means, spring means associated with said lever means and resiliently tending to hold said stub axles in substantial alignment with said second axle, and means providing a connection between said first and second axles.

3. A tandem wheel unit comprising a front axle, a pair of wheels journalled on said front axle, a rear axle, a pair of wheels dirigibly mounted on said rear axle to swing about axes intersecting their respective axes of rotation, yielding means tending to hold said dirigibly-mounted wheels in substantial alignment with said front wheels and constituting the sole control for said dirigible wheels, and means providing a connection between said front axle and said rear axle.

4. A tandem wheel unit comprising a frame, a front axle mounted on said frame, a pair of wheels journalled on said front axle, a rear axle mounted on said frame, a pair of wheels dirigibly mounted on said rear axle to swing about axes intersecting their respective axes of rotation, and spring means yieldably tending to hold said dirigible wheels in substantial alignment with said front wheels, said dirigible wheels being otherwise free to swing out of such alignment in response to lateral forces applied to said frame.

5. A tandem wheel unit comprising a frame, a front axle mounted on said frame, a pair of wheels journalled on said front axle, a rear axle mounted on said frame, a pair of wheels dirigibly mounted on said rear axle, an arm associated with each of said wheels, a first lever, a second lever, fulcrum means associated with said rear axle and supporting said levers for oscillation about points intermediate the ends of said levers, a link connecting the arm associated with one of said dirigible wheels with one arm of said first lever, a second link connecting the arm associated with the other of said dirigible wheels with the corresponding arm of said second lever, a contractile spring connecting said first-named wheel arm with the opposite arm of said first lever, a contractile spring connecting said second-named wheel arm with the opposite arm of said second lever, and means associated with said levers and tending to hold the same always in substantial parallelism.

6. The structure recited in claim 5 including a one-way pulling means in the connections between said springs and said levers.

7. A tandem wheel unit comprising a frame, a front axle mounted on said frame, a pair of wheels journalled on said front axle, a rear axle mounted on said frame, a pair of wheels dirigibly mounted on said rear axle, an arm associated with each of said wheels, a first lever, a second lever, fulcrum means associated with said rear axle and supporting said levers for oscillation about points intermediate the ends of said levers, a link connecting the arm associated with one of said dirigible wheels with one arm of said first lever, a second link connecting the arm associated with the other of said dirigible wheels with the corresponding arm of said second lever, a contractile spring connecting said first-named wheel arm with the opposite arm of said first lever, a contractile spring connecting said second-named wheel arm with the opposite arm of said second lever, and means associated with said levers and tending to prevent substantial relative movement between said levers, said last-named means being adjustable to vary the angular relation between said levers.

DONALD METTETAL, JR.